(12) United States Patent
Yu et al.

(10) Patent No.: US 7,088,777 B2
(45) Date of Patent: Aug. 8, 2006

(54) SYSTEM AND METHOD FOR LOW BIT RATE WATERCOLOR VIDEO

(75) Inventors: Keman Yu, Beijing (CN); Jiang Li, Beijing (CN); Jizheng Xu, Guangxi (CN); Shipeng Li, Irvine, CA (US)

(73) Assignee: Microsoft Corp., Redmond, WA (US)

( * ) Notice: Subject to any disclaimer, the term of this patent is extended or adjusted under 35 U.S.C. 154(b) by 788 days.

(21) Appl. No.: 10/302,624

(22) Filed: Nov. 22, 2002

(65) Prior Publication Data

US 2004/0101045 A1    May 27, 2004

(51) Int. Cl.
*H04B 1/66*    (2006.01)
(52) U.S. Cl. .................................. 375/240.28
(58) Field of Classification Search ........... 375/240.27, 375/240.28, 240.29; 382/232; H04N 7/12; H04B 1/66
See application file for complete search history.

(56) References Cited

U.S. PATENT DOCUMENTS 6,091,777 A * 7/2000 Guetz et al. ............ 375/240.11
6,597,811 B1 * 7/2003 Batkilim et al. ............ 382/232

OTHER PUBLICATIONS

U.S. Appl. No. 10/302,653, filed Nov. 22, 2002, Li et al.
U.S. Appl. No. 09/844,549, filed Apr. 28, 2001, Li et al.
Jiang Li, Gang Chen, Jizheng Xu, Yong Wang, Hanning Zhou, Keman Yu, King To Ng and Heung-Yeung Shum, "Bi-level Video: Video Communication at Very Low Bit Rates," *ACM Multimedia Conference 2001*, Sep. 3-Oct. 5, Ottawa, Ontario, Canada, pp. 392-400.
Ridler, T.W. and S. Calvard, Picture threshold using an iterative selection method, *IEEE Trans. on Sys., Man, and Cybernetics*, vol. SMC-8, 8:630-632.
N. Otsu, "A threshold selection method from gray-level histogram," *IEEE Trans. on Sys., Man and Cybernetics SMC-8*, 1978, pp. 223-237.
P.K. Sahoo, S. Soltani, and A.K.C. Wong, "A survey of thresholding techniques," *Computer Vision Graphics Image Processing*, 41, 1988, 233-260.

* cited by examiner

*Primary Examiner*—Tung Vo
(74) *Attorney, Agent, or Firm*—Lyon & Harr, LLP; Katrina A. Lyon

(57) ABSTRACT

A video compression/decompression procedure that provides a reliable, low bit video bit stream with some color features over relatively low bandwidth wireless networks. The procedure provides some pleasing color features in a video bit stream without needing a large bandwidth network like those needed for example for a MPEG 4 bit stream. The procedure provides the color features by using a bi-level Y luminance component and a number of UV chrominance combinations. The bi-level Y-component outlines the features of the image, while the UV-combinations describe the basic color information of the image.

15 Claims, 9 Drawing Sheets

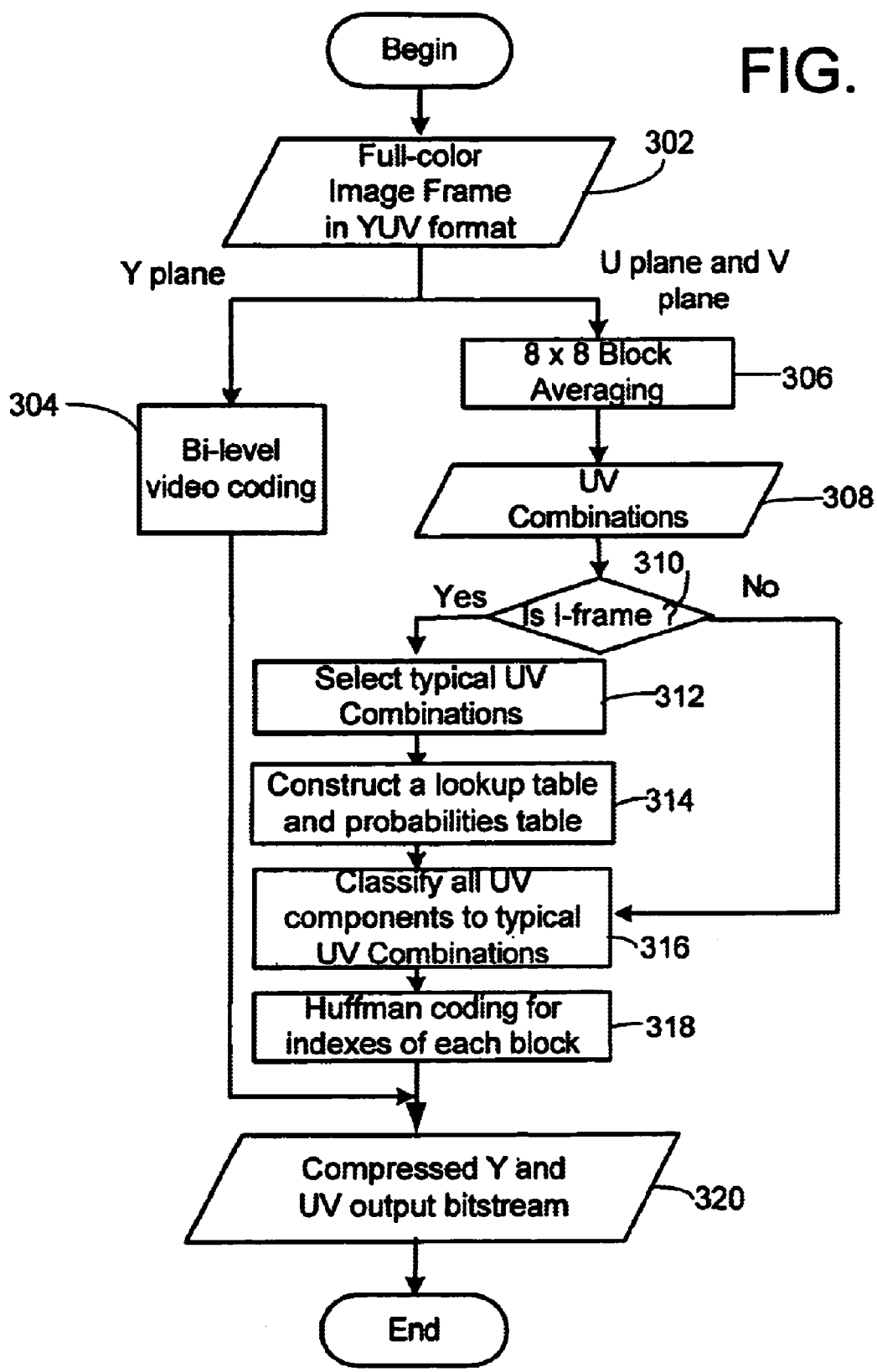

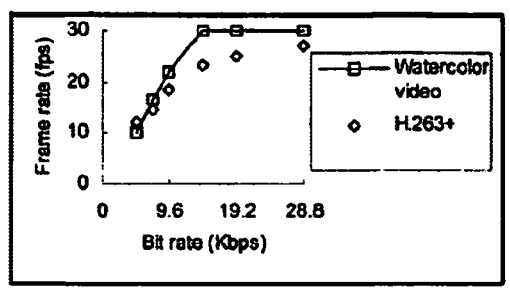
(a) Akiyo
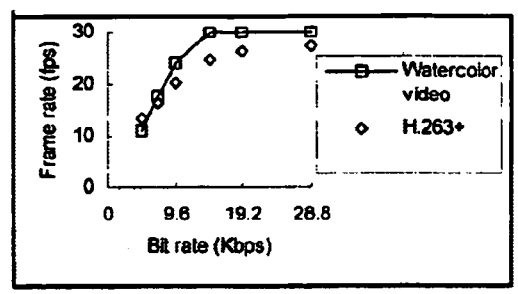
(b) Grandma
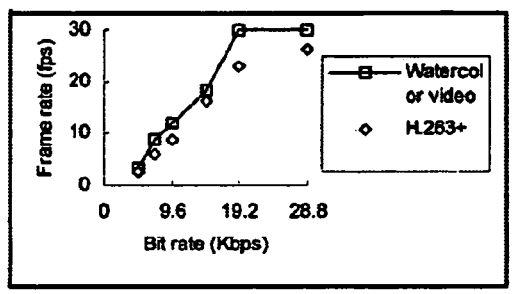
(c) Silent
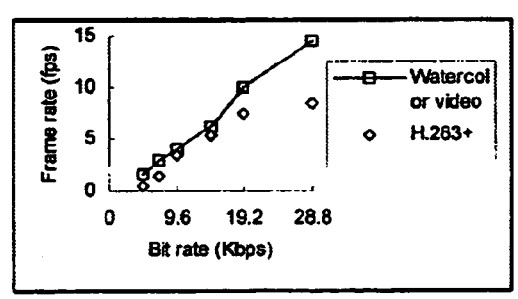
(d) Yu
FIG. 9

SYSTEM AND METHOD FOR LOW BIT RATE WATERCOLOR VIDEO

BACKGROUND

1. Technical Field

This invention is directed toward a system and method for video compression/decompression. More specifically, this invention is directed towards a video compression/decompression system and method that provides a reliable, low bit rate video stream with some color features. This bit stream can be transmitted via relatively low bandwidth wireless networks.

2. Background Art

Network services are being developed towards allowing users to access information anywhere, any time, and on any device. Video is an important part of the information required to meet this demand. While it is relatively easy to transmit popular MPEG [1] or H.26x [2] video via a broadband network, it is not so easy to transmit video through wireless networks with limited bandwidths. The bottleneck of transmitting videos through any network is usually in the low bandwidth end.

As a solution to transmitting video under low bandwidth network conditions, a video form was previously proposed, called bi-level video [3]. Bi-level video is generated by converting a gray-scale image to a bi-level image and then compressing a bi-level image sequence into a bi-level video. Special considerations are taken into account in the threshold and compression processes so that the resultant videos possess low bit rate, clear shape, smooth motion, and low latency properties. Although bi-level video achieves a very low bit rate, its appearance is only black and white. A great improvement could be made to the bi-level video if color could be added to its black and white appearance, while maintaining its low bit rate qualities.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". A listing of the publications corresponding to each designator can be found at the end of the Detailed Description section.

SUMMARY

The system and method of the invention is a low bitrate watercolor-like video form, which is constructed with a bi-level Y luminance component and a number of UV chrominance combinations. The bi-level Y-component outlines the features of an image and the UV-combinations describe the basic color information of the image. The UV combinations are dynamically chosen during encoding. The resultant video looks better than bi-level video and its bit rate is still lower than that of full-color video. Watercolor video can be used in video broadcast and communication in low bandwidth networks.

For an input video, its Y component is compressed using bi-level video coding. In addition, the UV components are first averaged in each block, then typical UV combinations are selected according to iterative grouping results of these combinations. After that, the chrominance information of each block is represented by an index to a lookup table of typical UV combinations. These indexes are further encoded using Huffman coding. Certain frames are preferably designated as intra-frames (i.e., I-frames), while a series of frames following each I-frame in the bi-level video sequence are designated as interframes (i.e., p-frames). The lookup table is transmitted with each I-frame. For P-frames, no selection process is needed, and the chrominance information of each block is just classified to the typical UV combinations of its corresponding I-frame. The coded results of Y components and UV components compose the final output bit stream.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the present invention will become better understood with regard to the following description, appended claims, and accompanying drawings where:

FIG. 3 is a flow chart depicting the watercolor video encoding process according to the present invention.

FIGS. 9(*a*) through (*d*) show the frame rates of a clip coded by the watercolor video encoder and the H.263+ encoder.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
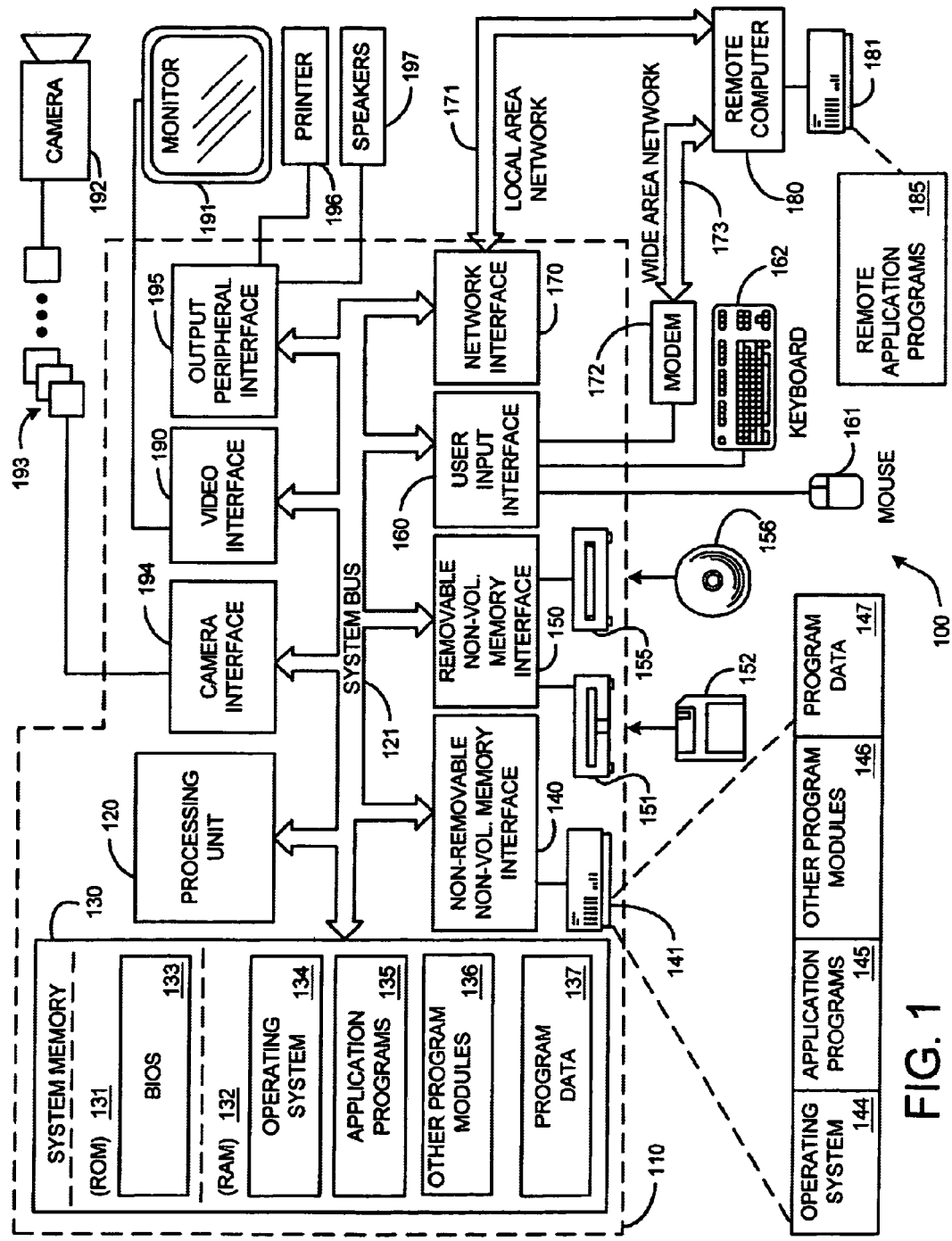
FIG. 1 is a diagram depicting a general purpose computing device constituting an exemplary system for implementing the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as an input device to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Low Bitrate Watercolor Video System and Method.

The key technologies in watercolor video coding are in describing the chrominance information of an image, and then selecting representative chrominance information for compression.

2.1 Background-Generation of Bi-Level Video.

One embodiment of the low bit-rate watercolor video system and method of the present invention employs on bi-level video form. A system and method of generating bi-level video is the subject matter of a co-pending patent application entitled "A System and Process for Broadcast and Communication with Very Low Bit-Rate Bi-level or Sketch Video" filed on Apr. 28, 2001, Ser. No. 09/844,549. By way of background this system and method of generating bi-level video is provided.

The process of generating bi-level video is preceded by obtaining or capturing an input video that will typically contain both audio and video components. The input video can be either a color video or a gray-scale video. The generating process begins by inputting the aforementioned digitized full-color or gray scale video. The input video is then split into its audio and video portions. The splitting can be accomplished using any conventional audio-video splitting method. Typically, the input video will have been compressed using some conventional video compression process. Thus, once split, the video portion of the frame, which constitutes image frames of the video, is decompressed if necessary. Next, the input video image frames are converted into bi-level image frames and compressed using a new, very low bit-rate, bi-level video coding system and process, which will be described in detail below.

While the video component of the input video frame is being decompressed, and then recompressed, the audio component of the frame can be processed concurrently. The processing of the audio component of each input video frame entails decompressing the audio data if necessary using standard methods specific to the type of audio compression used to compress the data. Preferably this decompression would also include a standard noise reduction procedure. The audio data is then recompressed. In this case it is preferred that a very low bit-rate audio compression method be employed to minimize the amount of data that must be transmitted. Some currently available examples of this type of audio noise compression are the HP Mobile Voice, SIPRO ACELP.NET, FnG MPEG Layer 3, and Microsoft Corporation's Windows Media™ audio codec (version 2) methods.

After the video part of bi-level video has been generated and compressed, and the audio data has been compressed, the audio and video components are synchronized and combined to produce a complete bi-level video. Any appropriate existing AVI multiplexing technique can be used for this purpose, such as AVI Mux in Microsoft DirectMedia 6.0. The completed bi-level video can be in the form of a video file or can take the form of a bit stream. The video file can be used in a broadcast application where the broadcast of the video is to take place sometime after its generation. The bit stream from of the video could be used for an immediate broadcast application, or for a video communications application. It is noted that in the case of the bit stream, the bi-level generation process can be viewed as a sequential process with the foregoing actions being performed on each frame or a group of frames of the input video. As portions of the overall bi-level video are generated, they are transmitted thus creating the aforementioned bit stream.

In order to transmit the bi-level video over a network to a receiving device, either from a previously generated file or as a real time bit stream, the video data will typically have to be prepared first using a packetizing technique applicable to the transmission method. For example, if the bi-level video is to be transmitted over the Internet, the data would be packetized via Internet protocols.

In general, the image frame portion of the bi-level video mentioned above is generated as follows. If the input video is a full color video, each frame is converted to a gray scale frame using conventional methods. The gray scale frames are then input in sequence to the present conversion process. Next, the incoming gray scale image frames are put through a group of conventional noise reduction filters to reduce noise. It is then determined whether the frame under consideration is an intra-frame (i.e., I-frame) or an inter-frame (i.e., p-frame). If the frame is an I-frame, it is processed directly using an adaptive thresholding procedure. Otherwise (i.e., the frame is a p-frame), it is compared with its immediately preceding frame using a static region detection and duplication procedure. The static region detection and duplication procedure entails inputting the gray scale image frame (j-1) preceding the p-frame under consideration. In addition, a dissimilarity threshold is input. This dissimilarity threshold defines at what point the difference between a pixel in the p-frame under consideration and the correspondingly-located pixel in the preceding gray scale image frame is considered drastic enough to indicate a change due to movement between the frames. For image regions that are within a dissimilarity threshold, each pixel is duplicated from its corresponding pixel in the preceding frame, and for pixels of the p-frame under consideration that are greater than the threshold, the pixel values remain unchanged. Once this process is complete the modified p-frame undergoes the aforementioned adaptive thresholding procedure. The adaptive thresholding procedure is used to calculate a suitable threshold for each image frame. This threshold is employed to compute both a bi-level image frame and a two-dimensional confidence level array from each gray scale image frame, which are then output. The confidence level array is made up of confidence level values assigned to each pixel location of the frame that are indicative of how likely each pixel is to be the color indicated by the threshold. The confidence level of each bi-level pixel can be simply measured by the difference between the gray-scale value of a pixel and the threshold. If the difference falls outside a threshold band around the computed threshold value for the frame under consideration, then the confidence level is high and a first binary reliability value is preferably assigned to the pixel location. The width of the threshold band is inputted for this purpose from a rate control procedure. If, however, the aforementioned difference falls within the threshold band, the confidence level is lower and a second binary reliability value is preferably assigned to the pixel location. After that, each frame is compressed by an adaptive context-based arithmetic coding technique. If the frame is an I-frame, it is coded with an intra-frame template, otherwise it is coded with an inter-frame template constructed with respect to pixels in the previous frame. To this end, the bi-level image frame computed for the frame preceding the frame under consideration is input. For pixels with their confidence levels within the threshold band, their bi-level values are modified according to the prediction of the context-based arithmetic encoding. The result of the adaptive context-based arithmetic coding technique is a series of bits representing a compressed bi-level image frame. A rate control procedure that employs factor adjustment and frame dropping can be used to limit the bit rate of the compressed video data output to within a given bandwidth. As a result, when the present coding process operates at very low bandwidths, What is reserved in high priority is the outline features of the objects. The factors adjusted include the dissimilarity threshold mentioned previously, which is output for use in the static region detection and duplication procedure, and the width of a threshold band, which is output and used in the aforementioned adaptive thresholding procedure. Finally, the bit stream representing the compressed bi-level video frames is output.

2.2 Overview of the Low Bit-rate Water Color Video System and Method.

Figure 2A:
FIGS. 2A, 2B, and 2C are images depicting the color input image used to derive the water color video shown in FIG. 2B and the bi-level black and white image.
Figure 2B:
Figure 2C:

The system and method of the invention is a low bit-rate watercolor-like video form, which is constructed with a bi-level Y luminance component and a number of UV chrominance combinations. The bi-level Y-component outlines the features of an image and the UV-combinations describe the basic color information of the image. The UV combinations are dynamically chosen during encoding. As shown in FIGS. 2A, 2B and 2C, the resultant video looks better than bi-level video and its bit rate is still lower than that of full-color video. Watercolor video can be used in video broadcast and communication in low bandwidth networks.

FIG. 3 provides an overview of the encoding used by one embodiment of the low bit rate watercolor system and method of the invention. As shown in FIG. 3, process action 302, a full-color image frame in YUV format is input into the system. The Y components represent the luminance information of an image, and the UV-combinations describe the color information. For frames in this input video, the Y component is compressed using bi-level video coding, as shown in process action 304. In one embodiment, the sampling rate of U and V is half of the sampling rate of the Y components. For example, a 16×16 block in the source image relates to 16 pixels by 16 lines of Y and the spatially corresponding 8 pixels by 8 lines of U and V. The UV components are first averaged in each block (process action 306). In one embodiment, 8×8 block averaging is used to divide a U plane and V plane into 8×8 blocks, and to obtain a UV-combination for each block by averaging all U values and V values, respectively, in this block. Once block averaging has been performed, typical UV combinations are defined (process action 308). If the video frame being processed is an I-frame, a prescribed number of typical UV combinations are selected from these combinations (process actions 310 and 312). The chrominance information of each block is then represented by an index to a lookup table of typical UV combinations and their probabilities (process action 314). In one working embodiment of the invention, the lookup table is composed of U and V values of 16 typical UV combinations and their probabilities. For P-frames, no selection process is needed, and the chrominance information of each block is just classified to the typical UV combinations of its corresponding I-frame (process actions 310 and 316). These indexes to the location of the UV combinations in the UV combination table are further encoded using Huffman coding, as shown in process action 318. The lookup table is constructed and written into the output bit stream for each I-frame, while P-frames are encoded using the lookup table of the previous I-frame. The coded results of Y components and UV components compose the final output bit stream associated with each frame (process action 320).

Key points of this general procedure will now be described in more detail.

2.3. Block Averaging

Figure 4:
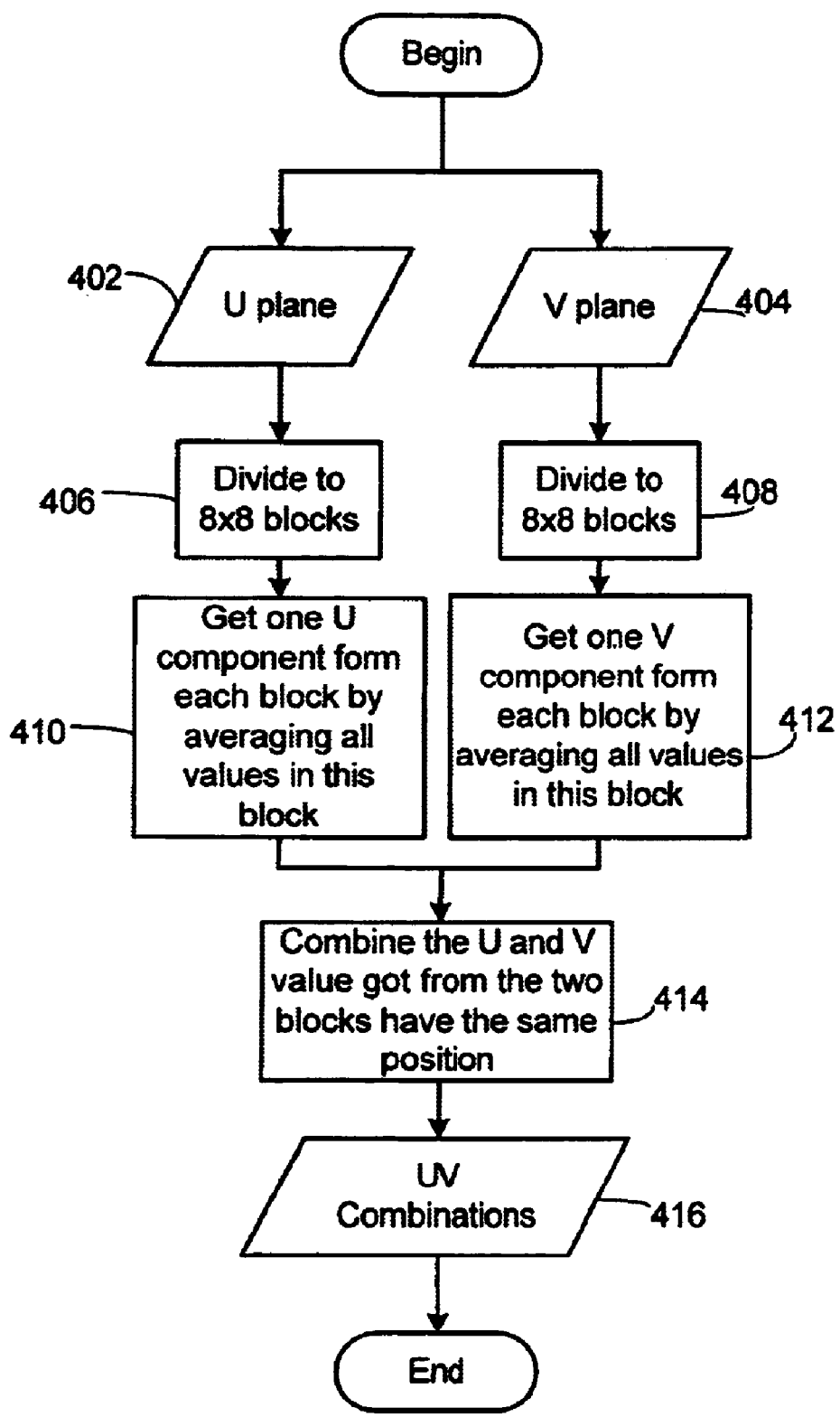
FIG. 4 is a flow chart depicting the process of block averaging employed by the present invention.

In regard to the above-described block averaging action, it is generally used to reduce the amount of data for each input frame that needs to be processed and transmitted. As shown in FIG. 4, in one embodiment of the invention, 8×8 pixel block averaging is used. It should be noted, however, that other block sizes could be used for averaging purposes. Processing of data in the U and V planes is conducted separately, but in parallel (process actions 402, 404). The U plane is divided into 8×8 blocks (process action 406), as is the V plane (process action 408). One U component is obtained for each block in the U plane frame, by averaging all of the U pixel values in this block (process action 410). Likewise, one V component is obtained for each block in the V plane, by averaging all of the V pixel values in this block (process action 412). The U and V values obtained from the U and V plane blocks that have the same position are then combined (process action 414). This results in a set of UV combinations, as shown in process action 416.

2.4. Kinds of UV Components Needed

Watercolor video draws from both bi-level video coding and MPEG video coding. Basically, in MPEG video coding, each picture is divided into some blocks. Each block is usually 16×16 in Y and 8×8 in U and V respectively. The resolution of U and V components are usually half of that of Y. These Y, U, and V values in each block are transformed from the spatial domain into a set of discrete cosine trans-form (DCT) coefficients of the frequency domain. Each of these coefficients is a weight associated with its corresponding DCT basis waveform. These coefficients are then quantized, and nonzero quantized values are compressed using an entropy coder. As the low bit rate watercolor video system and method uses only a bi-level Y component, it also not necessary to use very accurate UV distributions. Experimental results shown later will justify this consideration. Obviously, the simplest part of the DCT coefficients of each U and V block is just the first coefficient, i.e. the DC component. The physical meaning of the DC component is the average chrominance of the block.

2.5. The Number of Typical UV Combinations Needed

As watercolor video is specially developed for low bit rate video communication, only small resolution images are considered. Taking a quarter common intermediate format (QCIF)-size image for example, if such a QCIF-size (176×144) image is divided into 16×16 blocks, the total number of such blocks is 99. So there are totally 99 UV combinations after the above averaging process in one embodiment of the invention.

Figure 5:
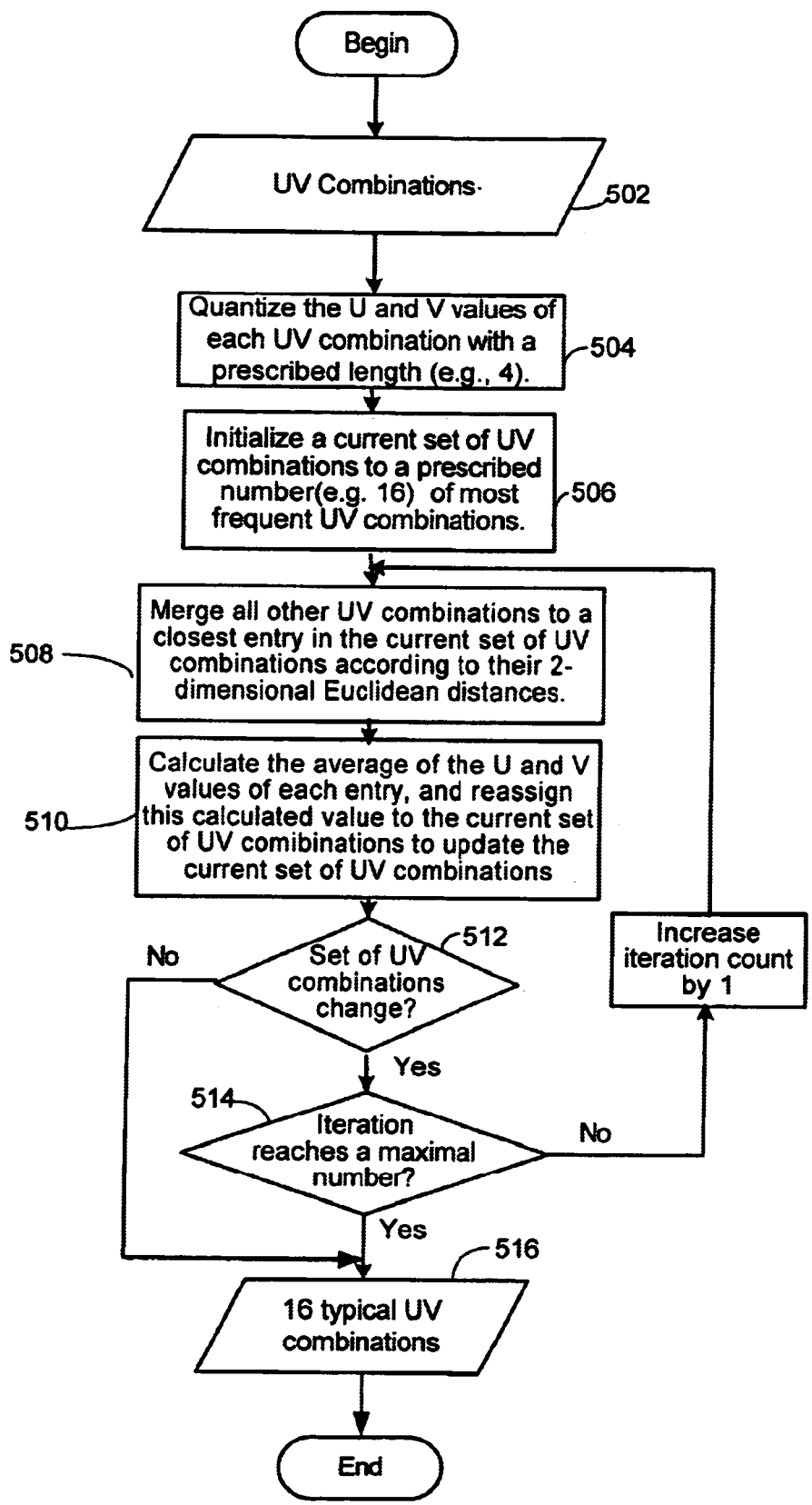
FIG. 5 is a flow chart depicting the process of selecting UV combinations according to the present invention.

In order to group the UV combinations and obtain a more limited number of representative UV combinations, the U and V values of each UV combination can be quantized. As shown in FIG. 5, process action 502, the UV combinations are input (process action 502). In one working embodiment of the invention, the values of U and V of each UV combination are quantized with a length of 4 (process action 504). After quantization, the total number of UV combinations is reduced to about 20–30 based on empirical data that was obtained using many video sequences. These UV combinations can be represented by indexes. In one working embodiment of the low bit-rate water color video system and method, as 4 bits can be used to represent 16 indexes, a total of 16 indexes are set up to represent the most frequent 16 UV combinations, as shown in process action 506. For the rest of the UV combinations, their 2-dimensional Euclidean distances from each of the 16 typical UV combinations are calculated via conventional methods and each of the remaining values is merged to the nearest typical UV combination (process action 508). The selection of the UV combinations can also be optimized as described below in the next paragraph.

2.6. Optimizing the Selection of Typical UV Combinations by Employing Lloyd-Max Quantization Theory.

As described above, the lookup table is composed of some prescribed number of combinations with highest statistical probabilities. In the case of the above-described working embodiment this number was 16. If the chrominance of an image is distributed relatively uniformly, i.e. the differences of the probabilities of these UV combinations are relatively small, this method will lead to evident errors. In order to overcome this drawback, the Lloyd-Max Quantization theory [4] is adopted to obtain the optimal UV combinations through iterations. The procedure, as described relative to one working embodiment, is as follows:

(1) Quantize the U and V values of each UV combination with a prescribed length. In the above-described working embodiment this length was 4 (process action 504).

(2) Select a prescribed number of the most frequent UV combinations as a current set of UV combinations. (process action 506). In the above-described working embodiment this number was 16.

(3) All the other UV combinations are merged to the closest entry in the current set of UV combinations according to their 2-dimensional Euclidean distances. (process action 508).

(4) Calculate the average of the U and V values of each entry and reassign this calculated value to the entry to compose the new 16 UV combinations.(process action 510).

(5) If the values of U and V of the prescribed number of UV combinations (e.g., 16) no longer change, or the iteration count reaches a maximal number (initially the iteration count is set to zero), the iteration stops, otherwise go to step (3) (process actions 512 and 514).

The result of this selection process is a set of optimal typical UV combinations, as shown in process action 516. In the working embodiment discussed above, 16 typical UV combinations are derived.

2.7. Further Optimizing the UV Combinations By Eliminating Black or Near Black Blocks.

On the display side, the bi-level Y component and UV components are combined to produce the final color image. For those UV combinations that are generated from blocks in which the Y component value is 0, the final color in the display is also black. In other words, they do not affect the appearance of the watercolor image. So UV combinations that are only generated from Y=0 blocks can be ignored in the statistical process. This results in more indexes being assigned to UV combinations that affect the final visual effects of a watercolor image. In practice, it is hard to find a block in an image that all the Y component values are 0, so in one working embodiment of the low bit rate watercolor video system and method, if over 90% of Y component values of a block are 0, the UV combination is ignored. Since as described later in subsection 2.9, the scene in P-frames is very similar to that of the I-frame, this method will not obviously affect the quality of P-frames. Experiments on a QCIF Akiyo video clip show that the final average code length of each block is reduced to 2.28 bits with this method.

2.8. Compressing the UV Components

Figure 6:
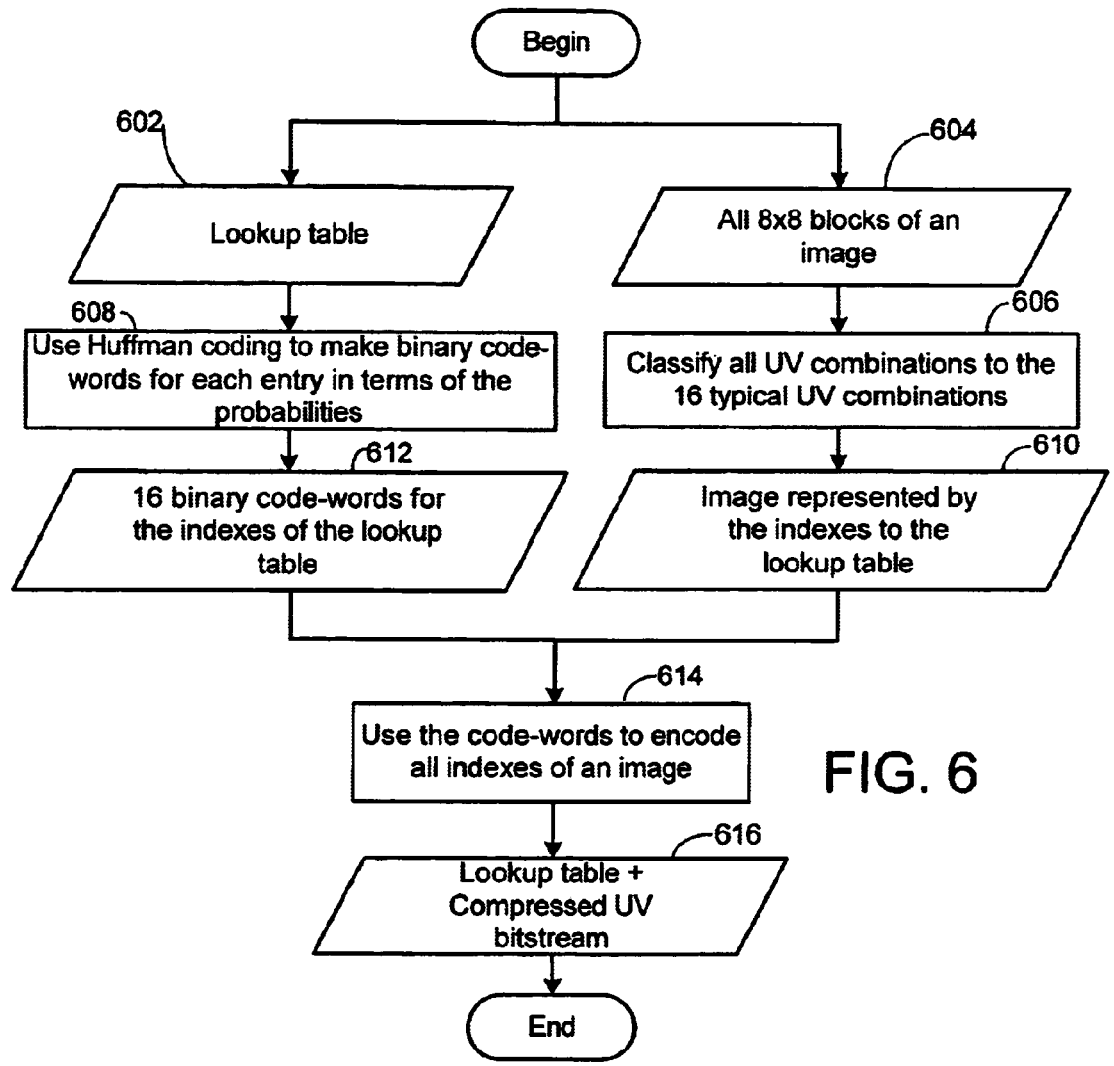
FIG. 6 is a flowchart depicting the Huffman coding as employed by the present invention.

The aforementioned calculations result in a UV combination lookup table that stores the U and V values of the prescribed number of typical UV combinations of an image. In the working embodiment discussed above, the result was a UV combination lookup table that stores the U and V values of 16 typical UV combinations of an image. As shown in FIG. 6, the lookup table and all blocks of an image are input into the system (process actions 602, 604). Each block (e.g., 16×16) of an image is assigned with an index of the table (process action 606) and the image is represented by the indexes to the lookup table (process action 610). Huffman coding is employed to encode these indexes. The probability for each entry of the lookup table is calculated in terms of its frequency. Binary codes are made from these probabilities using Huffman coding, as shown in process action 608. The binary codes are then used to encode all indexes of the image (process action 614). The lookup table and compressed UV bit stream is then transmitted (process action 616). For example, when the indexes of blocks are compressed in the QCIF Akiyo video sequence, an average code length of 3.86 bits results. Therefore, the UV components of each frame occupy only 99×3.86=382 bits for the embodiment previously described in Section 2.5.

2.8. P-frame Consideration

The above procedure is assumed to be first applied to the I-frames of a video sequence. For P-frames, the averaged UV components of each block are classified to the typical UV combinations of I-frames. This treatment will not cause obvious errors because in a low bit rate video communication scenario, people are not very sensitive to details of a small scene, and the background is usually not changed. The central part of the scene is usually the user's face which possesses only limited color types. Since it is possible to use the same lookup table of an I-frame for its subsequent P-frames, it is only necessary to transmit the lookup table which stores the U and V values of the typical UV combinations of each I-frame.

2.9. Decoding and Displaying

The bit stream of each frame of a video includes bi-level Y components and UV components. In the decoder, the bit stream of the bi-level Y components and UV components are decompressed and output to display. It is noted that block artifacts usually occur since only the average UV values of a 16×16 block are used. On the display side, a standard bilinear interpolation is used to eliminate them. For pixels that are located along the edge of the image, their UV values are just assigned to the UV values of the block.

Figure 7:
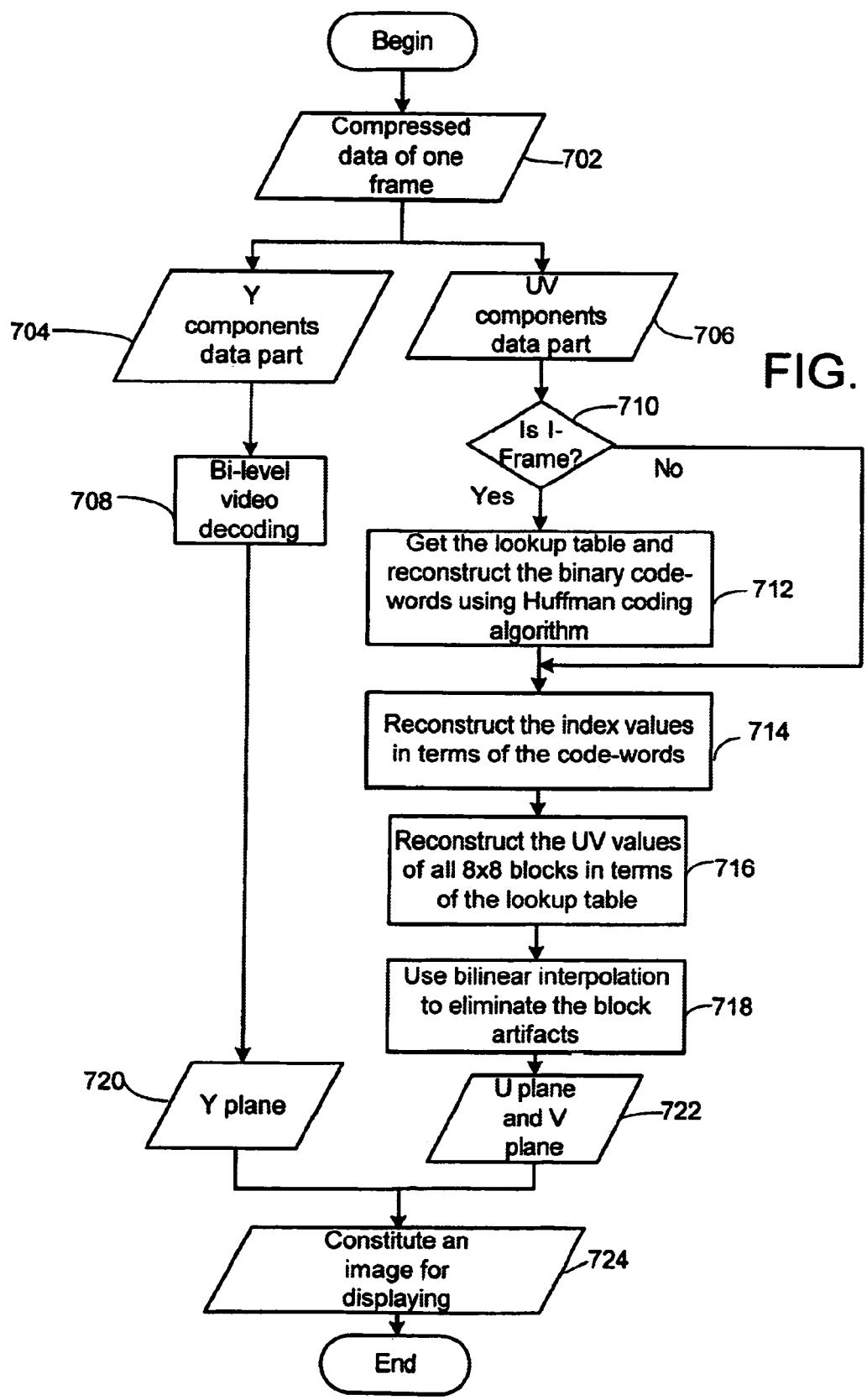
FIG. 7 is a flow chart depicting the decoding employed by the present invention.

More specifically, referring to FIG. 7, the compressed data of one video frame is received by the decoder (process action 702). The data is split into the Y component part and the UV component part (process actions 704 and 706). The Y component data is encoded with bi-level decoding (process action 708). The UV component data is evaluated as to whether it is an I-frame (process action 710). If it is, the lookup table is retrieved and the binary code words are reconstructed using the Huffman decoding algorithm (process action 712). If it is not an I-frame, process action 712 is skipped. The index values are reconstructed in terms of the code words, as shown in process action 714. The UV values of all of the blocks of the frame are then reconstructed in terms of the lookup table (process action 716). Bi-linear interpolation is used to eliminate any block artifacts (process action 718). The U plane and V plane data, as well as the Y plane data, is thus obtained (process actions 720 and 722), which are combined to constitute an image for display (process action 724).

3.0 Experimental Results

Figure 8:
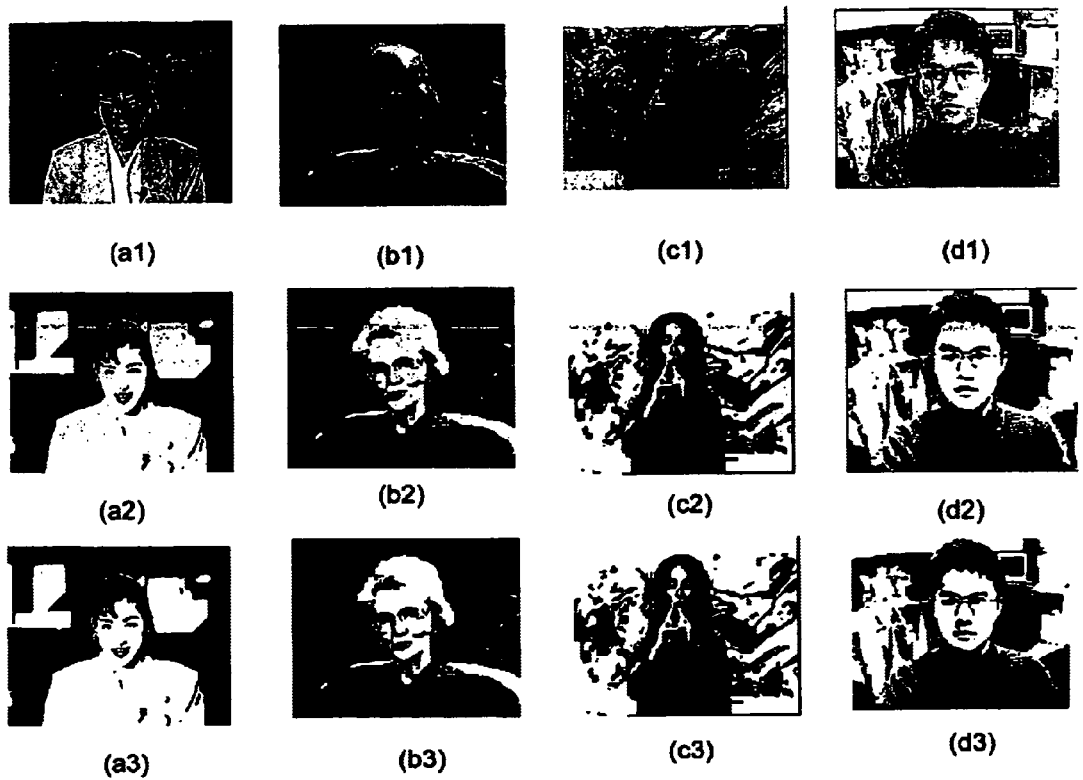
FIG. 8 provides a series of corresponding full color, water color video and low bit rate images.

The approach was tested on both standard MPEG test video clips (FIG. 8 (a), (b), (c)) and ordinary clips captured from real scenes using PC digital cameras (FIG. 8(d)). Video clip (a) Akiyo represents scenes with little head motion, clip (b) Grandma describes scenes with relatively large head motion and clip (c) Silent possesses large motion of arms and hands. Video clip (d) Yu represents scenes with very large motion of the whole body. All the video clips are in a format of QCIF and at a frame rate of 30 fps. The visual effects and frame rates obtained by the watercolor video system and method were compared to one of the H.263+ implementations [5].

FIG. 8(a) through (d) show one typical frame of each clip coded with the H.263+ encoder, the watercolor video encoder and the bi-level video encoder respectively. It is shown that the images (with subscript 1) coded with the H.263+ encoder are filled with some blocks which result in the artifacts on Akiyo, Grandma and Yu's faces and Silent's whole body, while the images (with subscript 2) coded by the watercolor video encoder are as clear as the images (with subscript 3) coded by the bi-level video encoder. Furthermore, the basic colors of the original clips are kept and the whole visual effect is obviously better than that of the bi-level images.

The smoothness of motion is a feature of watercolor video. FIGS. 9(a) through (d) show the frame rates of each clip coded by the watercolor video encoder and the H.263+ encoder. The frame rates of coded video clips are counted when bandwidths are set to 4.8, 7.2, 9.6, 14.4, 19.2 and 28.8 Kbps, and the I-frame interval is set to 5 seconds. Experiments show that in most cases the watercolor video encoder generates higher frame rates than does the H.263+ encoder. Therefore, watercolor video provides smoother motions of scenes. The exceptions are that in clip (a) Akiyo and (b) Grandma, the frame rates generated by H.263+ encoder are a little higher than those produced by watercolor video encoder when the bandwidths are about 4.8 Kbps. This is because with such given bandwidths, even if the chrominance information were removed from the watercolor video, the frame rates generated by the two encoders are very close. However, given the same conditions in clip (c) Silent and (d) Yu, the large motion made the frame rates produced by H.263+ encoder lower than those obtained by the watercolor video encoder The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

REFERENCES:

[1] ISO/IEC JTC1/SC29/WG11 N3312 Coding of moving pictures and audio March 2000/Noordwijkerhout.
[2] ITU-T Recommendation H.263 Video coding for low bit rate communication, 02/98.
[3] Jiang Li, Gang Chen, Jizheng Xu, Yong Wang, Hanning Zhou, Keman Yu, King To Ng and Heung-Yeung Shum, "Bi-level Video: Video Communication at Very Low Bit Rates," ACM Multimedia Conference 2001, September 30–October 5, Ottawa, Ontario, Canada, pages 392–400.
[4] A. K. Jain, Fundamental of Digital Image Processing, Prentice Hall, 1989.
[5] H.263+ public domain code, TMN Version 3.0, Dept of Electrical Engineering, University of British Columbia, Canada, http://spmg.ece.ubc.ca/h263plus/h263plus.htm Wherefore, what is claimed is:

1. A process for encoding a video signal, comprising the following process actions:
   inputting a full color image frame in YUV format, wherein Y represents the luminance information of the image, and UV represents the color information of the image;
   dividing said full color image frame into a Y component image and a UV component image;
   dividing said Y component image into blocks of a prescribed size and encoding said blocks of said Y component image using bi-level video coding, resulting in an encoded y component image;
   dividing said UV component image into blocks of a prescribed size and computing an average UV value for each block;
   determining the UV combinations, wherein said UV combination is the U and V value for the block, for all blocks of said UV component image;
   selecting a prescribed number of the most typical UV combinations and the probability of each UV combination;
   constructing a lookup table for each of the prescribed number of the most typical UV combinations and associated probabilities;
   classifying all blocks of said UV component image to one of said typical UV combinations, and representing each block of said UV component image by an index to said lookup table of typical UV combinations; and encoding said lookup table and the index for each block of said UV component image, resulting in an encoded UV component image.

2. The process of claim 1 further comprising the process action of transmitting the corresponding blocks of said encoded Y component image and said encoded UV component image and said lookup table.

3. The process of claim 1 wherein the process action of encoding said lookup table and said index for each block of said UV component image classified to one of said UV combinations comprises encoding said blocks using Huffman coding.

4. The process of claim 1 further comprising the process actions of:
inputting more than one full color image frame;
designating a certain number of said more than one full color image frames as intra-frames (I-frames);
designating a certain number of said more than one full color image frames as inter-frames (P-frames); and
for the intraframes only, performing the process actions of
selecting a prescribed number of the most typical UV combinations and the probability of each UV combination;
constructing a lookup table for each of the prescribed number of the most typical UV combinations and associated probabilities.

5. The process of claim 4 further comprising the process action of transmitting the combined corresponding blocks of said encoded Y component image and said encoded UV component image and said lookup table for every intraframe.

6. The process of claim 1 wherein the process action of dividing said UV component image into blocks of a prescribed size and obtaining an average UV value for each block, comprises the process actions of:
dividing the UV component image into U and V component images; for said U component image,
dividing said U component image into blocks of prescribed size;
averaging all values in each block to obtain one U component for every block;
for said V component image,
dividing said V component image into blocks of prescribed size;
averaging all values in each block to obtain one V component for every block; and
combining the U and V value obtained for the two corresponding blocks that have the same position for all blocks in the U and V component images to obtain a UV combination for each block.

7. The process of claim 6 wherein said prescribed block size is 8 by 8 pixels for both U component image and Y component image.

8. The process of claim 1 wherein said prescribed block size for said Y component image is 16 by 16 pixels.

9. The process of claim 1 wherein said prescribed number of UV combinations is 16.

10. The process of claim 1 wherein the process action of selecting a prescribed number of the most typical UV combinations and the probability of each UV combination comprises the process actions of:
using the determined UV combinations, quantizing the U and V value of each UV combination with a prescribed length;
selecting a number of the most frequent UV combinations and initializing this as a current set of UV combinations;
merging the UV combinations not determined to be in the number of most frequent combinations to the closest UV combination entry in the number of the most frequent UV combinations;
calculating the average of the U and V values of each UV combination and reassigning this calculated value to the current set of UV combinations to compose a new set of UV combinations;
if the current set of UV combinations no longer changes or a maximal number is reached, designating the current set of UV combinations as the most typical set of UV combinations; and
if the current set of UV combinations changes, repeating said merging and calculating process actions.

11. The process of claim 3 wherein the process action of encoding said blocks comprises the process actions of:
inputting said lookup table, and the index for each block of the UV component image;
using said Huffman coding to make binary code words for each lookup table entry in terms of the probabilities;
generating binary code words for a prescribed number of the indexes in the lookup table;
classifying all UV combinations of said blocks of the UV component image to the prescribed number of typical UV combinations;
representing said blocks of UV component image by indexes to the lookup table using code words to encode all indexes representing the image; and
outputting said lookup table and encoded UV bit stream.

12. The process of claim 11, comprising the following process actions:
inputting data of a compressed frame of an image compressed with the process actions of claim 1;
dividing said full compressed image frame into a Y component image and a UV component image;
dividing said Y component image into blocks of a prescribed size and decoding said blocks of said Y component image using bi-level video decoding, resulting in an decoded Y component image;
for the UV component image, if the image is an intraframe image,
extracting the lookup table and reconstructing the encoded binary code words using a Huffman decoding algorithm;
reconstructing the index values in terms of the code words;
reconstruction the UV values of all blocks of a prescribed size in terms of the lookup table;
using bilinear interpolation to eliminate block artifacts;
obtaining a UV decoded component image; and
constituting an image for display by outputting said decoded Y component image and said decoded UV component image.

13. A system for adding color to a low bit rate black and white bit stream, the system comprising:
a general purpose computing device; and
a computer program comprising program modules executable by the computing device, wherein the computing device is directed by the program modules of the computer program to,
inputting a full color image frame in YUV format, designated as an intra-frame, wherein Y represents the luminance information of the image, and UV represents the color information of the image;

dividing said full color image frame into a Y component image and a UV component image;

dividing said Y component image into blocks of a prescribed size and encoding said blocks of said Y component image using bi-level video coding, resulting in an encoded y component image;

dividing said UV component image into blocks of a prescribed size and computing an average UV value for each block;

determining the UV combinations, wherein said UV combination is the U and V value for the block, for all blocks of said UV component image;

selecting a prescribed number of the most typical UV combinations and the probability of each UV combination;

constructing a lookup table for each of the prescribed number of the most typical UV combinations and associated probabilities;

classifying all blocks of said UV component image to one of said typical UV combinations, and representing each block of said UV component image by an index to said lookup table of typical UV combinations; and encoding said lookup table and the index for each block of said UV component image, resulting in an encoded UV component image.

14. The process of claim 1 further comprising the process actions of:

inputting more than one full color image frame;

designating a certain number of said more than one full color image frames as inter-frames (P-frames); and for the inter-frames only, not performing the process actions of selecting a prescribed number of the most typical UV combinations and the probability of each UV combination;

constructing a lookup table for each of the prescribed number of the most typical UV combinations and associated probabilities.

15. A computer-readable medium having computer-executable instructions for adding color to a black and white bit stream, said computer executable instructions comprising modules for:

inputting a color image frame in a format, wherein one component represents the luminance information of the image, and a second component represents the color information of the image;

dividing said full color image frame into a luminance component image and a color component image;

dividing said luminance component image into blocks of a prescribed size and encoding said blocks of said luminance component image using bi-level video coding, resulting in an encoded luminance component image;

dividing said color component image into blocks of a prescribed size and computing an average color value for each block;

determining the color combinations, wherein said color combination is represented by two values for the block, for all blocks of said color component image;

selecting a prescribed number of the most typical color combinations and the probability of each color combination;

constructing a lookup table for each of the prescribed number of the most typical color combinations and associated probabilities;

classifying all blocks of said color component image to one of said typical color combinations, and representing each block of said color component image by an index to said lookup table of typical color combinations; and encoding said lookup table and the index for each block of said color component image, resulting in an encoded color component image.

* * * * *